July 5, 1960 — J. C. DAVY ET AL — 2,944,156
APPARATUS FOR SENSING RECORDS
Filed Jan. 9, 1959 — 3 Sheets-Sheet 1
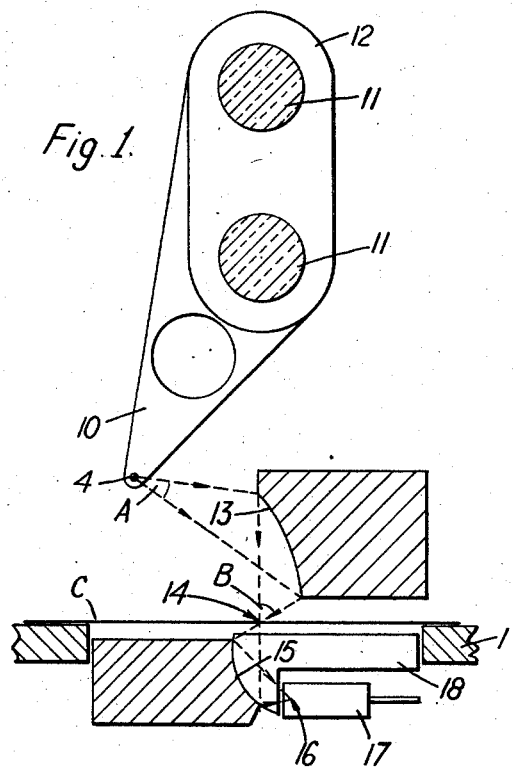
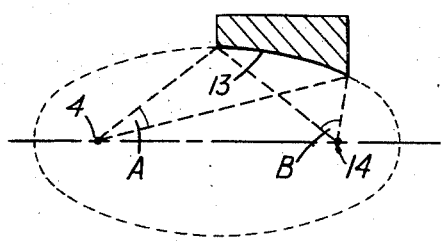
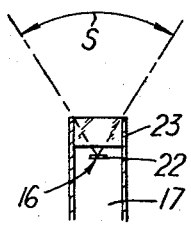
Inventors
JOHN C. DAVY
VICTOR E. BATEMAN
By *Minie & Smiley*
Attorneys Inventors
JOHN C. DAVY
VICTOR E. BATEMAN
By Imirie & Smiley
Attorneys July 5, 1960  J. C. DAVY ET AL  2,944,156
APPARATUS FOR SENSING RECORDS
Filed Jan. 9, 1959  3 Sheets-Sheet 3
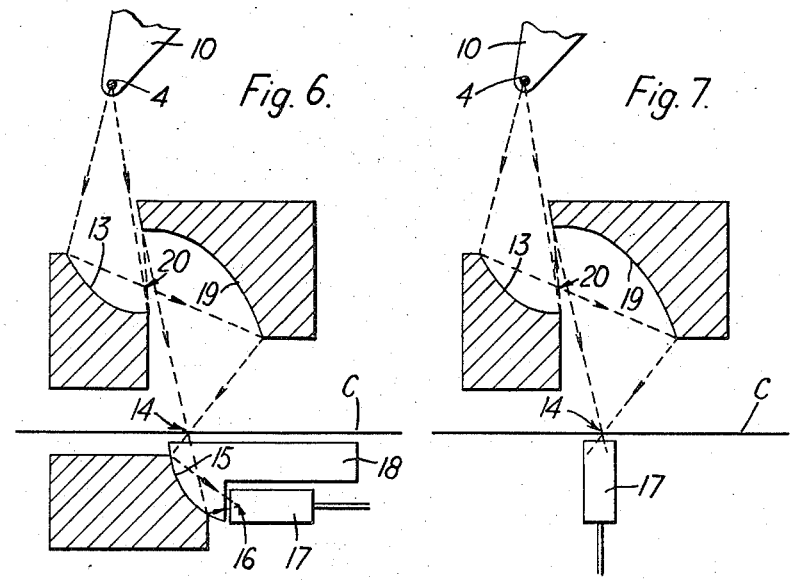
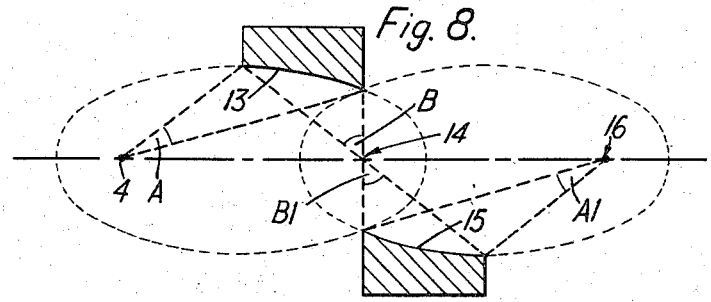
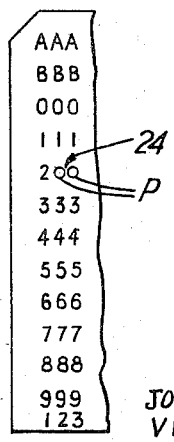
Inventors
JOHN C. DAVY
VICTOR E. BATEMAN
By
Attorneys

2,944,156

APPARATUS FOR SENSING RECORDS

John Colin Davy, Warlingham, and Victor Eugene Bateman, Three Bridges, England, assignors, by mesne assignments, to International Computers and Tabulators Limited, London, England, a British company Filed Jan. 9, 1959, Ser. No. 785,840

Claims priority, application Great Britain July 9, 1958

14 Claims. (Cl. 250—219)

This invention relates to apparatus for sensing records, for example cards or tape, provided with data indications formed by perforations or radiant energy responsive marks.

It has already been proposed to provide apparatus for sensing records of the kind referred to above which apparatus comprises a source of radiant energy and an optical system arranged to direct a radiant energy beam on to photo electric devices which when activated produce electrical signals. In the known optical systems, however, there are usually provided simple lenses which, due to spherical aberration tend to cause the beam to focus at different points depending on the width, thickness, and refractive indices of the lenses. Further, chromatic aberration tends to cause different wave lengths emitted from the source to focus at different points.

It is a main object of the present invention to provide a sensing apparatus which is relatively cheap to produce and which avoids the use of lenses and the disadvantages which follow from the use thereof.

According to the invention there is provided apparatus for sensing a record provided with data indications formed by perforations or radiant energy responsive marks, comprising photo-electric devices adapted on activation thereof to produce electric signals, a system of elliptical reflectors to direct a beam of radiant energy on to said devices to effect activation thereof, one focus of at least one of said reflectors being located on the path along which a record to be sensed is movable, and a straight resistance wire located at one focus of the first reflector of said system and adapted on connection to a source of electrical potential for heating to a temperature providing maximum emissivity at a wave length approaching that for which said photo-electric devices have maximum sensitivity.

Figure 2:
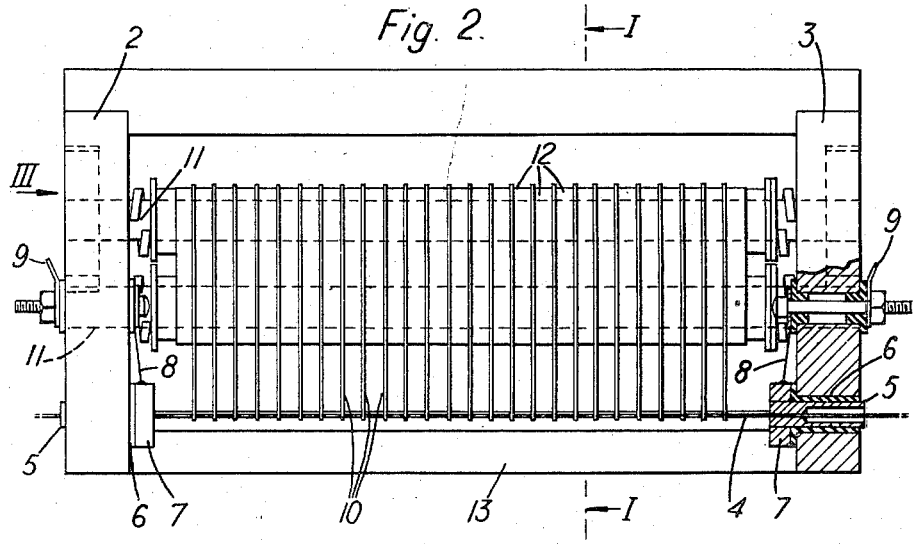
Figure 3:
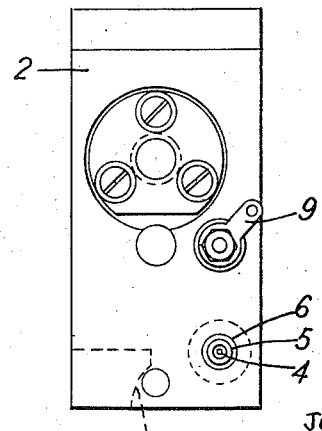

In order that the invention may be clearly understood some embodiments thereof will now be described, by way of example, with reference to the accompanying drawings, in which:

Fig. 1 is in part a section on line 1—1, Fig. 2,

Fig. 2 is an elevation, partly in section, of the upper part of apparatus according to the invention, Fig. 3 is a view looking in the direction of arrow III, Fig. 2, Figs. 4 and 5 are diagrams illustrating parts of the apparatus of Fig. 1, Figs. 6 and 7 illustrate modifications to the apparatus of Fig. 1, Fig. 8 is a diagram illustrating the co-relation of two of the reflectors shown in Figs. 6 and 7, and Fig. 9 is a part of a statistical record card.

Like reference characters refer to like or similar parts throughout the figures of the drawings.

Referring to Figs. 1 to 5, a perforated record card C is moved along the bed 1 of a machine by any suitable known feeding means such as feed rollers, not shown. Frame members 2, 3, Fig. 2, are supported by the bed 1, by means not shown, and support a source of radiant energy shown as a wire 4.

The wire 4 is a straight resistance wire, made for example of 80/20 nickel-chrome, and has its opposite ends clamped in collets 5 in a manner such as to permit the wire to be movable relative to the frame members to permit lengthwise expansion and contraction thereof. To this end the collets 5 are supported for free lengthwise movement by electrically insulating bushes 6 mounted in the frame members. Clamp collars 7 carried by the collets 5 are connected by conductor wires 8 to terminals 9 adapted for connection to a source of electrical potential not shown.

The wire 4 is prevented from sagging by thin metal supports 10 which are spaced apart lengthwise of the wire. The wire passes through apertures formed in the supports 10 and which constrain the wire radially while permitting expansion or contraction thereof. The supports are carried by rods 11 made of electrically insulating material, for example the rods are glass rods or are ceramic insulated metal rods, the ends of which are mounted in the frame members 2, 3. The thin metal supports are spaced from each other at intervals of about ⅛ inch by spacers 12 and the supports 10 and spacers 11 are electrically insulated from each other by phosphating the surfaces thereof.

Also carried by the frame members 2, 3 is a single-plane concave elliptical reflector 13, this being the first reflector of a reflector system. The surface of the reflector is vacuum coated with a material having a high reflective index, for example aluminium, to obtain maximum reflectivity and the wire 4 is located at one focus of the reflector. The other focus of the reflector is located on the path of the card C as indicated at 14, Fig. 1.

Beneath the path of the card C there is located a second elliptical reflector 15, similar to reflector 13, one focus of which is coincident with the focus 14 while the other focus 16 is located on devices 17 adapted for activation by radiant energy to produce an electric signal. The devices 17 are considered as consisting of photoelectric devices such as photoelectric cells. Thin polished aluminium baffles 18, Fig. 1, are provided to prevent "cross-talk" between adjoining devices 17, it being understood that there is a device 17 provided for each data-indicating position of a record column or row to be sensed at any one time. For example, if as indicated in Fig. 9 each vertical column of a record consists of twelve data-indicating positions and the card is to be sensed column-by-column then twelve devices 17 are provided.

When the apparatus is in use the wire 4 is heated by passing an electric current through it, and when heated to about 1000° C. the wire has an oxide formed on its surface which gives a radiant emissive value approaching that of a black body which has maximum efficiency. The wire remains straight during expansion and contraction due to the supports 10 and because the collets 5 permit free lengthwise movement of the wire at such times. The photoelectric cells 17 are preferably of a germanium junction type sensitive to infra-red radiation from 0.5 to 2 microns with a peak sensitivity at 1.7 microns, and the wire 4 has an emission within this range and although its peak emissivity does not exactly match that of the photoelectric cells the output from the cells is sufficiently large to need only a very simple and cheap amplifier or to be capable of directly operating a thyratron. It will be understood that the initial and replacement cost of wire 4 is considerably less than that of an electric bulb. Further, because the wire is heated to obtain maximum emissivity at a wave-length approaching that for which the cells 17 have maximum sensitivity, the intensity of light from source 4 is low as compared with that of an electric lamp bulb thus avoiding strong bright light, as is usual with a bulb, and annoyance to the machine operator.

The beam of radiant energy from source 4 is focussed on the card C by the reflector 13 and is obturated from cells 17 by imperforate portions of the card. If, however, there is a perforation P, Fig. 9, at any data indicating position on which the beam is focussed a part of the beam passes through the perforation and is focussed on the appropriate cell 17 by reflector 15 thus activating that cell and producing an electric signal indicative of the fact that a data-indicating perforation has been sensed.

The modified embodiment of the invention illustrated in Fig. 6 is generally similar to that described above but in this embodiment the reflector system consists of three elliptical reflectors 13, 15 and 19 and the radiant energy beam is focussed on the card path by the elliptical reflector 19, which in this embodiment of the invention is the second reflector of the reflector system. The wire 4 is located at one focus of the first reflector 13 and the other focus 20 of reflector 13 is coincident with one focus of reflector 19 whose other focus is at 14 on the card path. As can be seen from Fig. 6, one focus of the reflector 15 is coincident at 14 with said other focus of reflector 19 and the other focus of reflector 15 is located on the cells 17.

In the modified embodiment of the invention illustrated in Fig. 7, the cells 17 are located beneath the card path at a position which is closely adjacent thereto and the reflector system is similar to that of Fig. 6 but omits the elliptical reflector 15. The reflectors 13 and 19 are both, as is the case in the embodiment at Fig. 6, located above the card path and, as in Fig. 6, one focus of each of the reflectors is located at position 20 while the other focus of the second reflector 19 is at 14 on the card path, and the wire 4 is located at the other focus of the reflector 13.

With the reflector system illustrated in Fig. 1, the reflector 13 is so designed that the width of the image of wire 4 is equal to the width of the wire and the size of the image required accordingly determines the diameter of the wire 4. This system, however, has the slight disadvantage that the angle A is less than angle B, see Fig. 4. Since, as indicated in Fig. 5, the sensitive element 22 of cell 17 is "pocketed" in the cell body 23 the element 22 will only "see" a limited angle of light as indicated by S, Fig. 5, and accordingly angle S limits angle B and thus angle A which determines the proportions, that is $$\frac{A}{360}$$

of the radiant energy emanating from wire 4 which can reach the elements 22 of the cells 17.

When, however, the reflector system is as illustrated in Fig. 6, or Fig. 7, the principle of operation is as shown in Fig. 8 which shows that the angles A and B will be the same as A1 and B1 respectively so that the amount of radiant energy the cells 17 can "see" can be increased.

Further, if desired, the first reflector 13 of either of the reflector systems illustrated in Figs. 6 and 7 can be made to demagnify the source 4 and the reflector 19 to magnify the image but by a smaller degree. By this means the size of the resultant image will be less than that of the source 4 and angle A1 will be greater than angle A. This has the advantage that a larger source 4 can be used, thus giving longer life, and although the initial and resultant angles will be similar to those in Fig. 4 the image will be smaller.

By careful design the reflectors can be made to produce at 14 an image width which is sufficiently narrow to be completely cut-off by the bridge 24, Fig. 9, of card material which occurs between the perforations in adjoining vertical columns of a card. This will permit the beam of radiant energy to be interrupted by the card between the sensing of adjoining card columns so that the cells 17 will respond simultaneously irrespective of any slight positional errors thereof. It is found that with cells 17 of the kind described above the output therefrom when using a "narrow" image as just described is sufficiently large to need only a very simple and cheap amplifier, or can be used to operate a thyratron direct.

Although in the foregoing description the apparatus according to the invention has been described with reference to the sensing thereby of a record card it is to be understood that the apparatus can be used to sense perforated tape. Further, if desired, the apparatus may be used to sense records on which data is recorded by marks, instead of perforations, adapted to be responsive to radiant energy.

We claim:

1. Apparatus for sensing a record provided with data-indications formed by perforations or radiant energy responsive marks, comprising photo-electric devices adapted on activation thereof to produce electric signals, a system of elliptical reflectors to direct a beam of radiant energy on to said devices to effect activation thereof, one focus of at least one of said reflectors being located on the path along which a record to be sensed is movable, and a straight resistance wire located at one focus of the first reflector of said system and adapted on connection to a source of electrical potential for heating to a temperature providing maximum emissivity at a wave length approaching that for which said photo-electric devices have maximum sensitivity.

2. Apparatus for sensing a record provided with data-indications formed by perforations or radiant energy responsive marks, comprising a reflector system consisting of a first elliptical reflector, a second elliptical reflector, and a third elliptical reflector of which the first and second reflectors are located above the path of a record to be sensed and the third reflector is located beneath the path, said first and second reflectors each having one focus located at a position common thereto, a straight resistance wire adapted for connection to a source of electrical potential and located at the other focus of the first reflector, the other focus of the second reflector together with one focus of the third reflector being located on said path, and devices adapted for activation by radiant energy to produce electric signals, said devices being located at the other focus of the third reflector so that a beam of radiant energy is directed from said source on to the devices by the reflector system.

3. Apparatus for sensing a record provided with data-indications formed by perforations or radiant energy responsive marks, comprising a reflector system consisting of a first elliptical reflector, a second elliptical reflector, and a third elliptical reflectors of which the first and second reflectors are located above the path of a record to be sensed and the third reflector is located beneath the path, said first and second reflectors each having one focus located at a position common thereto, a straight resistance wire adapted for connection to a source of electrical potential and located at the other focus of the first reflector, the other focus of the second reflector together with one focus of the third reflector being located on said path, frame members supporting said wire and permitting free lengthwise expansion and contraction of the wire, means carried by said frames and supporting the wire along the length thereof to prevent sagging, and devices adapted for activation by radiant energy to produce electric signals, said devices being located at the other focus of the third reflector so that a beam of radiant energy is directed from said source on to the devices by the reflector system.

4. Apparatus for sensing a record provided with data-indications formed by perforations or radiant energy responsive marks, comprising a reflector system consisting of a first elliptical reflector, a second elliptical reflector, and a third elliptical reflector of which the first and second reflectors are located above the path of a record to be sensed and the third reflector is located beneath the path, said first and second reflectors each having one focus located at a position common thereto, a straight resistance wire adapted for connection to a source of electrical potental and located at the other focus of the first reflector, the other focus of the second reflector together with one focus of the third reflector being located on said path, frame members, collets gripping the ends of the wire and supported by the frames to be freely movable relative thereto in the direction of the length of the wire to permit lengthwise expansion and contraction of the wire, means carried by the frames and supporting the wire along the length thereof to prevent sagging, and devices adapted for activation by radiant energy to produce electric signals, said devices being located at the other focus of the third reflector so that a beam of radiant energy is directed from said source on to the devices by the reflector system.

5. Apparatus for sensing a record provided with data-indications formed by perforations or radiant energy responsive marks, comprising a reflector system consisting of a first elliptical reflector, a second elliptical reflector, and a third elliptical reflector of which the first and second reflectors are located above the path of a record to be sensed and the third reflector is located beneath the path, said first and second reflectors each having one focus located at a position common thereto, a straight resistance wire adapted for connection to a source of electrical potential and located at the other focus of the first reflector, the other focus of the second reflector together with one focus of the third reflector being located on said path, frame members, collets gripping the ends of the wire and supported by the frames to be freely movable relative thereto in the direction of the length of the wire to permit lengthwise expansion and contraction of the wire, electrically insulating rods carried by the frames, thin metal supports carried by and spaced apart lengthwise of the rods, said metal supports having apertures through which said wire passes to prevent sagging thereof, and devices adapted for activation by radiant energy to produce electric signals, said devices being located at the other focus of the third reflector so that a beam of radiant energy is directed from said source on to the devices by the reflector system.

6. Apparatus according to claim 5, wherein the rods are glass rods.

7. Apparatus according to claim 5, wherein the rods are ceramic insulated metal rods.

8. Apparatus according to claim 1, wherein the reflector system comprises a first elliptical reflector and a second elliptical reflector located respectively above and below the path of the record and each with one focus located on said path, said wire being located at the other focus of the first reflector and said photo-electric devices located at the other focus of the second reflector.

9. Apparatus according to claim 1, wherein the wire is supported by frame members permitting free lengthwise expansion and contraction of the wire, and including means carried by said frames and supporting the wire along the length thereof to prevent sagging.

10. Apparatus according to claim 9, including collets gripping the ends of the wire and supported by said frames to be freely movable relative thereto in the direction of the length of the wire.

11. Apparatus according to claim 9, wherein said means comprises electrically insulated rods carried by the frames, and thin metal supports carried by and spaced apart lengthwise of the rods, said supports having apertures through which said wire passes.

12. Apparatus according to claim 11, wherein the rods are glass rods.

13. Apparatus according to claim 11, wherein the rods are ceramic insulated metal rods.

14. Apparatus according to claim 1, wherein the reflector system comprises a first elliptical reflector and a second elliptical reflector both located above the path of the record and each having one focus thereof located at a position common thereto, said wire being located at the other focus of said first reflector and the other focus of the second reflector being located on the path of the record.

References Cited in the file of this patent

UNITED STATES PATENTS

| | | |
|---|---|---|
| 533,795 | Edwards | Feb. 5, 1895 |
| 1,763,630 | Hopkins | June 10, 1930 |
| 2,203,000 | Smith | June 4, 1940 |
| 2,541,247 | Herr | Feb. 13, 1951 |
| 2,586,609 | Burke | Feb. 19, 1952 |
| 2,819,649 | McLeod et al. | Jan. 14, 1958 |